United States Patent [19]
Berntsen et al.

[11] Patent Number: 4,845,956
[45] Date of Patent: Jul. 11, 1989

[54] REGULATING DEVICE FOR THE SUPERHEAT TEMPERATURE OF THE EVAPORATOR OF A REFRIGERATION OR HEAT PUMP INSTALLATION

[75] Inventors: Bjarne K. Berntsen; Mads F. Prebensen, both of Nordborg; Ole Ploug, Augustenborg, all of Denmark

[73] Assignee: Danfoss A/S, Nordborg, Denmark

[21] Appl. No.: 177,331

[22] Filed: Apr. 4, 1988

[30] Foreign Application Priority Data

Apr. 25, 1987 [DE] Fed. Rep. of Germany ....... 3713869

[51] Int. Cl.$^4$ .............................................. F25B 41/00
[52] U.S. Cl. ......................................... 62/225; 62/212
[58] Field of Search .................. 62/225, 224, 223, 222, 62/212, 211, 210, 204, 231, 157, 158; 236/92 B

[56] References Cited

U.S. PATENT DOCUMENTS

| | | | |
|---|---|---|---|
| 4,523,435 | 6/1985 | Lord | 62/225 X |
| 4,617,804 | 10/1986 | Fukushima et al. | 62/225 X |
| 4,621,502 | 11/1986 | Ibrahim et al. | 62/225 X |
| 4,646,532 | 3/1987 | Nose | 236/92 B |
| 4,653,288 | 3/1987 | Sayo et al. | 62/225 X |
| 4,685,309 | 8/1987 | Behr | 62/212 |

Primary Examiner—Harry B. Tanner
Attorney, Agent, or Firm—Wayne B. Easton

[57] ABSTRACT

The invention relates to a device and method for regulating the superheat temperature of the evaporator of a refrigeration or heat pump system. The existing and desired superheat values are compared at intervals of two and the rate of departure between these two values is utilized for adjusting the desired superheat value.

9 Claims, 3 Drawing Sheets

REGULATING DEVICE FOR THE SUPERHEAT TEMPERATURE OF THE EVAPORATOR OF A REFRIGERATION OR HEAT PUMP INSTALLATION

The invention relates to a regulating device for the superheat temperature of the evaporator of a refrigeration or heat pump installation, wherein the evaporator, a compressor, a condenser and an expansion valve controllable by the regulating device are connected behind each other in a closed circuit, and a temperature sensor arrangement is provided for the inlet and outlet temperature of the evaporator, the regulating device comprising means for determining the existing value of the superheat temperature of the evaporator depending on the temperature signals of the sensor arrangement, a desired value generator for the desired value of the superheat temperature, a comparator for comparing the desired and existing values of the superheat temperature to determine a regulation departure, a setting device for setting the expansion value depending on the regulation departure, and a control circuit for producing an optimum regulating quality.

In a known regulating device of this kind, the expansion valve is controlled so that as little unvaporised cooling liquid as possible reaches the compressor from the evaporator by way of the suction conduit. For this purpose, the setting signal of the expansion valve is controlled depending on the size and the speed of change of the superheat temperature of the vapour in the evaporator, the desired value of the superheat temperature being permanently set according to the nominal power of the refrigeration plant in question. In this way, however, one does not ensure that the refrigeration plant is used to an optimum during all operating conditions, e.g., on changes in the load, evaporator pressure, condenser pressure and the like. For example, with a high load for a short period (high cooling demand), the regulator may call for a much higher superheat temperature than normal, so that the evaporator would have to be designed to correspondingly high superheat temperature even though it is not necessary for the normal case.

The invention is based on the problem of providing a regulating device of the aforementioned kind in which optimum superheating of the evaporator is ensured automatically independently of load variations, different nominal data for the evaporator and independently of the refrigerant that is used.

According to the invention, this problem is solved in that the desired value of the superheat temperature is adjustable by the control circuit depending on the regulating quality.

In this solution, the desired value of the superheat temperature is automatically adapted to the current regulating quality, particularly the speed of change in the superheat temperature. Thus, with a low superheat temperature when the outlet temperature of the evaporator drops correspondingly frequently by reason of a periodic (spatial) approach of the liquid-gas limit to the outlet of the evaporator, the desired value is automatically set to a higher value until the superheat temperature has reached a substantially stable position at least approximately near the steady value and thus the gas-liquid limit in the evaporator.

Preferably, the control circuit is a microprocessor with a data store in which one can store data representing the value of the regulating quality and the desired value of the superheat temperature, the microprocessor producing a signal for changing the stored desired value of the superheat temperature when the constantly stored value of the regulating quality exceeds a predetermined limiting value. This is a simple way of achieving automatic adaptation of the superheat temperature desired value. By reason of the regulation with "flowing" or "floating" superheat temperature desired value without an absolute value, the regulating quality is substantially independent of a pressure drop in the evaporator, the accuracy with which the temperatures are measured in front of and behind the evaporator, as well as defective installing of the sensor arrangement. The flunctuations in the superheat temperature by reason of changes in the desired value or when controlling interfering parameters are very low. It is therefore possible to work with a superheat temperature which is only slightly above the minimum value at which the gas-liquid limit in the evaporator just assumes a stable position.

In particular, one may ensure that, during a data storage period, the microprocessor stores a plurality of measurements of the superheat temperature and their speed of change, that these measurements are compared by a comparator with a stored limiting value, including a tolerance range, and that the desired value of the superheat temperature is changed in the one or other direction or retained unaltered depending on the results of the comparison after termination of the data storage period. In this way, one ensures that short intense changes in the superheat temperature are not taken into account for changing the superheat temperature desired value.

In this case it is possible for delivery of the changed desired value from the data store of the microprocessor to be initiated when the measurement had exceeded the tolerance range for the period of a predetermined fraction, preferably 10 to 20%, of the data storage period.

Another construction can reside in that the control circuit comprises counters of which the counting capacity in each case corresponds to the number of measurements made during the data storage period and of which one counter counts the number of measurements and the other counters receive counting pulses by a comparator depending on whether the speed of change in the superheat temperature lies below, within or above its tolerance range and whether the superheat temperature lies within or beyond its tolerance range. This facilitates very simple monitoring of the regulation departure and its speed of change with a low microprocessor capacity.

Preferably, the data storage period commences only when the superheat temperature measurements differ by a predetermined amount, preferably 1° C., from the initial desired value after expiry of a predetermined starting time following switching on of the installation. In this way one ensures that the superheat temperature can be rapidly brought to the set desired value during a starting time of, for example, 6 minutes, without taking any additional measures.

This enables the microprocessor to set as high superheat temperature desired value of preferably about 10° C. during the starting time of preferably about 6 minutes, whereafter a lower operating desired value is set and the data storage period may commence.

If the superheat temperature falls below the momentary desired value by an excessively large amount, e.g., more than about 3° C., on account of a change of a parameter of the installation, e.g., the load, or after switching on again, the superheat temperature desired value may be changeable immediately. In this way, automatic influence may be brought about even before commencement or expiry of the data storage period.

For example, the setting device of the expansion valve may be controllable by a PI regulating element of which the transmission function, particularly the amplification factor, can be automatically set depending on the transition behaviour of the superheat temperature, particularly depending on the regulation departure.

The sensor arrangement may comprise one sensor measuring the inlet temperature and another measuring the outlet temperature of the evaporator, the sensor signals being feedable to a comparator arrangement by which a control signal can be delivered which forcibly reduces the servo-signal of the setting device to a predetermined fraction, for example about 60%, of its momentary value when the inlet or outlet temperature of the evaporator lies beyond a predetermined safety range, for example about $-70°$ C. to $+45°$ C. This has the advantage that the cooling operation of the installation is continued even upon defective operation of the sensor arrangement, e.g., on the occurrence of a short circuit or line break, albeit with a lower cooling performance, so that the produce will not be spoilt immediately on account of an excessively high temperature in the cooling chamber.

Preferably, the control signal of the comparator arrangement simultaneously initiates an alarm so that incorrect functioning of the sensor arrangement can be rectified in good time.

Further, it is advantageous for the alarm of a cooling installation to be initiated when the cooling room temperature exceeds a limiting value which decreases with time from a high initial value, e.g., $10°$ C., to near the maximum desired value of the cooling room temperature.

This has the advantage that, on starting the installation or repeated opening of the door of the coolroom to insert or withdraw produce, through which a correspondingly high regulation departure (excessive temperature in the coolroom) can occur, the alarm will not be initiated immediately but only if the limiting value is exceeded after a prolonged operating period.

It is also favourable if a predetermined delay period is provided between exceeding of the limiting value and initiation of the alarm. The delay period may be several minutes, e.g., 10 to 20 minutes. This avoids immediate initiation of the alarm through opening of the coolroom door for a short period, such as for a visual inspection.

A preferred example of the invention and its developments will now be described in more detail with reference to the drawing, wherein.

Figure 1:
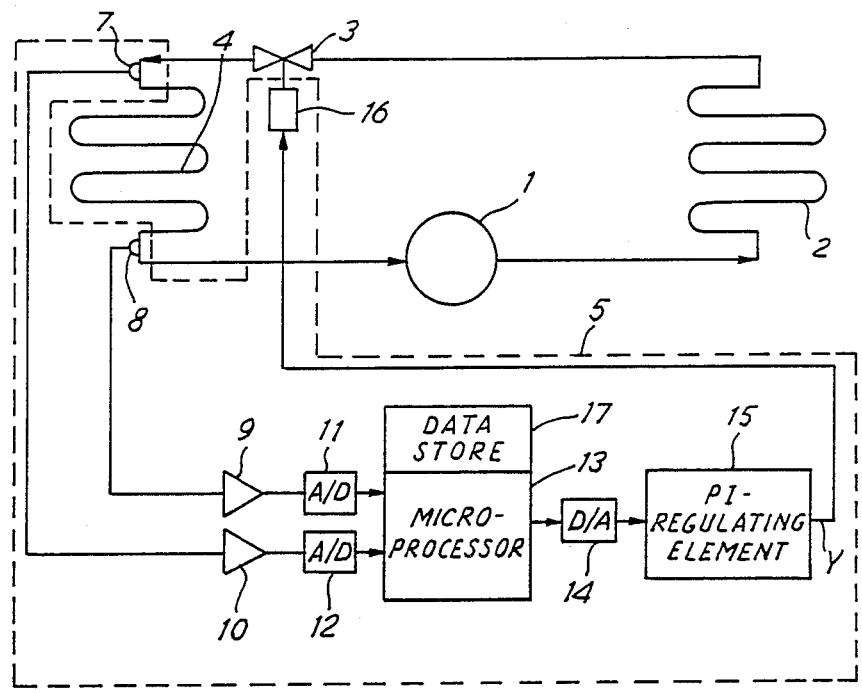
FIG. 1 illustrates a refrigeration installation with a regulating device according to the invention.

The refrigeration plant of FIG. 1 contains a refrigerant circuit with a compressor 1, a condenser 2 in the form of a heat exchanger coil, an expansion valve 3 and an evaporator 4 in the form of a heat exchanger coil. Connected to the refrigerant circuit there is a regulating device 5 which regulates the superheat temperature of the refrigerant in the evaporate 4. For this purpose, the regulating device 5 contains a sensor arrangement consisting of two temperature sensors 7 and 8. The temperature sensor 7 measures the inlet temperature $T_E$ and the other temperature sensor 8 measures the outlet temperature $T_A$ of the evaporate 4. The regulating device 5 also comprises two amplifiers 9, 10, two analogue/digital converters 11, 12, a microprocessor 13, a digital-/analogue converter 14, a PI regulating element 15 and a setting device 16 for the expansion valve 3.

The sensor signals are fed by way of the amplifiers 9, 10 and analogue/digital converters 11, 12 to the microprocessor 14 which had a data store 17 simultaneously serving as a desired value generator. An output signal of the microprocessor representing the regulation departure is fed to the D/A converter 14 and the PI regulating element 15 to the setting device 16 as a servo-signal for the expansion valve 3. The setting device 16 may be a pulse width-modulated or thermally controllable setting device. Through the function of the microprocessor, the PI element 15 may be digital and incorporated therein.

In the microprocessor 13, through differentiation of the temperature sensor signals the existing value of the superheat temperature of the evaporator 4, or rather the refrigerant therein, is determined and compared with a variable superheat temperature desired value UTS. After determining the regulating quality R, i.e., a function of the amount and speed of change $d(UT)/dt$ of the superheat temperature UT, the microprocessor calls for a different superheat temperature desired value UTS from the data store 17, depending on the regulating quality R.

Figure 2:
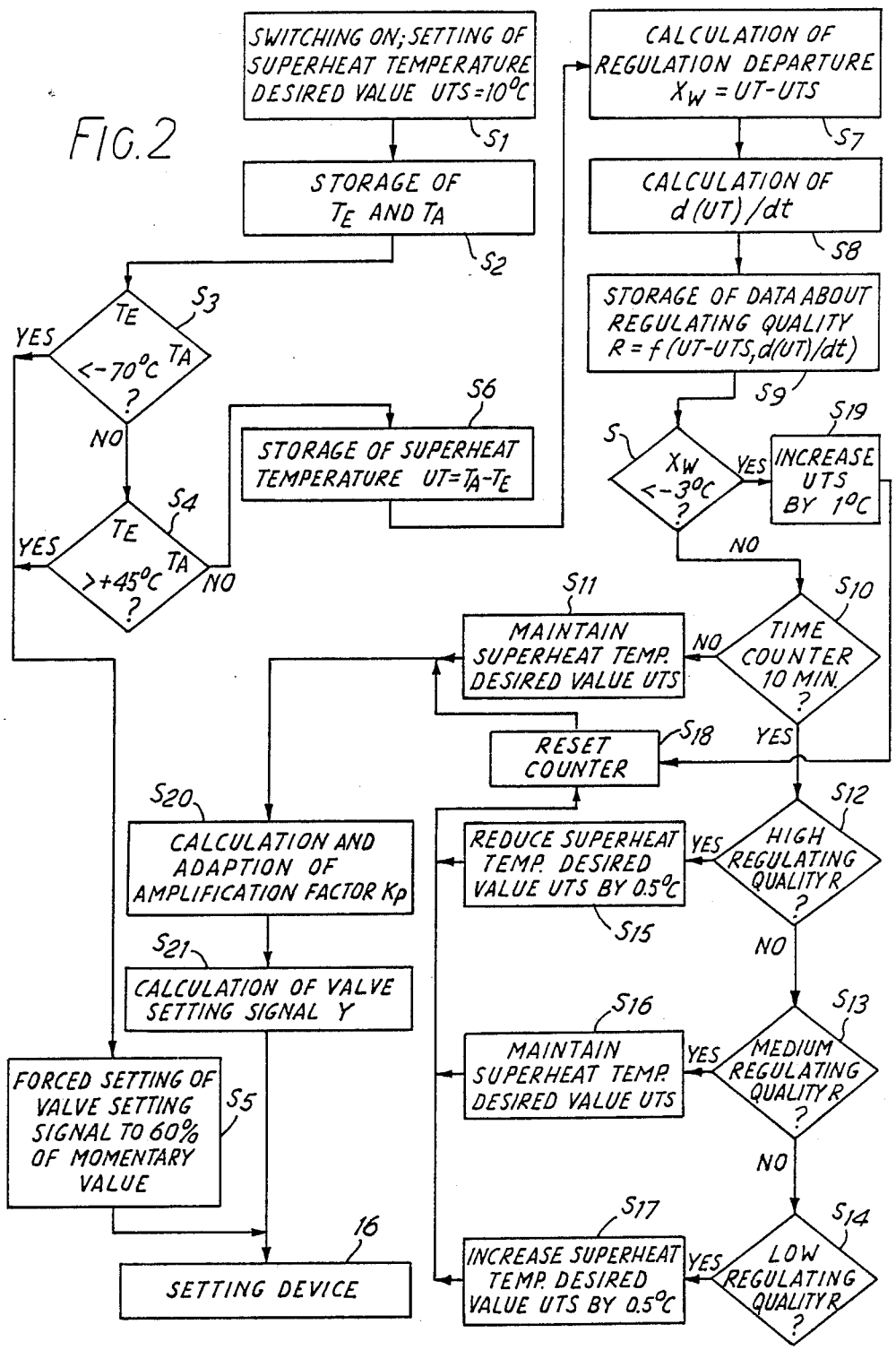
FIG. 2 is a flow diagram of the operation of the regulating device of FIG. 1.

The operation of the regulating device 5 will now be described in more detail with reference to the signal flow diagram of FIG. 2. In the signal flow diagram, $S_1$ to $S_{21}$, represent functional units which are realised by corresponding circuits that can also be realised by corresponding programme steps or stages.

Upon switching the installation on, the circuit $S_1$ brings about a setting of a high superheat temperature desired value of, for example, $10°$ C. which is called out of the data store 17 and utilised for calculating a regulation departure Xw, depending on which there is formed the servo-signal of the setting device 16 that determines the degree of opening of the valve. It is important especially in the starting phase to operate with a high superheat temperature desired value which brings about substantially gentle starting of the refrigeration plant.

By means of the circuit $S_2$, the inlet temperature $T_E$ and the outlet temperature $T_A$ of the evaporator 4 are constantly stored. The stored temperatures $T_E$ and $T_A$ are continuously compared in comparators $S_3$ or $S_4$ with temperatures of $-70°$ C. and $+45°$ C. before they are accepted. If the temperatures lie below $-70°$ C. or above $+45°$ C., it is assumed that there is a sensing error, e.g., a short circuit or a line break in one of the sensors 7 and 8. When such an error is detected, the circuit $S_5$ ensures that the servo-signal for the setting device 16 is forcibly reduced to a value of 60% of the momentary value which can be called out of the data store. This reduction causes the degree of opening of the expansion valve 3 to be correspondingly reduced so that, on the occurrence of a sensing error, the operation of the refrigeration plant is continued until the error is eliminated, albeit at a reduced refrigeration output. In this way one avoids spoiling of sensitive produce until the fault has been eliminated.

If the temperatures indicated by the sensors lie within the safety range of $-70°$ C. to $+45°$ C., the circuit $S_6$ calculates the superheat temperature UT by forming the difference $T_A - T_E$. Subsequently, the regulation departure $X_w = Tu - UTS$, i.e., the difference between the superheat temperature UT and the superheat temperature desired value UTS is calculated in the circuit $S_7$.

Thereafter, the speed of change d(UT)/dt of the superheat temperature is determined in the circuit $S_8$ and then the regulating quality R is determined in the circuit $S_9$ as a function of the regulation departure $X_w$ as well as of the speed of change of the superheat temperature and stored in the data store 17. In the circuit S, one then checks whether the regulation departure is smaller than $-3°$ C., i.e., whether the superheat temperature lies more than 3° C. below the set superheat temperature desired value. If not, one checks as a criterion for the regulating quality whether the speed of change and the superheat temperature or the regulation departure lie within predetermined tolerance ranges, i.e., whether the calculated superheat temperature fluctuates more intensively in the course of a series of measurements than allowed for by the tolerance range. The speed of change in the superheat temperature d(UT)/dt can, for example, be calculated by determining the difference between two successive measurements at a fixed time interval.

The number of successive measurements determines the duration of the data storage period, 24 measurements being carried out within the data storage period. A time counter $S_{10}$ checks whether the 24 measurements have been carried out. If this is not yet the case, i.e., the time measured by the time counter $S_{10}$ is still less than 10 minutes, then the superheat temperature desired value just employed is maintained in the circuit $S_{11}$. When the first 10 minutes have expired, the content of additional data stores, e.g., counters $S_{12}$, $S_{13}$ and $S_{14}$, is requested. During each of the 24 measurements, the counter $S_{12}$ receives a counting pulse when the speed of change of the superheat temperature is small, i.e, below its tolerance range, and when the superheat temperature lies within its tolerance range, the counter $S_{13}$ receives a counting pulse when the speed of change of the superheat temperature is acceptable, i.e., within its tolerance range, and when the superheat temperature lies within its tolerance range, and the counter $S_{14}$ receives a counting pulse when the speed of change of the superheat temperature lies above its tolerance range (is too large) and when the superheat temperature lies beyond its tolerance range.

Depending on the state of the counters, e.g., if the fluctuation of the regulated quantity was not tool high for 60% of the 24 measurements, it is decided whether the momentary superheat desired value is to be maintained, reduced by 0.5° C. or increased. Following the end of the data storage period, the counters are reset by the circuit $S_{18}$ and a new data storage period is introduced.

In contrast, if the circuit S detected a regulation departure $X_w$ below $-3°$ C., the superheat temperature desired value UTS is increased by 1° C. in the circuit $S_{19}$, i.e., a superheat temperature desired value 1° C. higher is called out of the data store, whereupon the counters are first reset by the circuit $S_{18}$ and the loop containing the circuits $S_8$ to $S_{18}$ is likewise traversed in the manner described above.

The circuits $S_{20}$ and $S_{21}$ then calculate a signal for adaptation of the amplification factor $K_P$ of the PI regulating element 15 and the servosignal Y for the setting device 16 depending on the regulation departure $X_w$, the regulation departure controlling the amplification factor of an amplifier contained in the PI regulating element 15.

A modification of the control circuit for processing the measurements could be one which comprises counters of which the counting capacity in each case corresponds to the number of measurements determined during the data storage period and of which a first counter counts the number of measurements, a second counter receives from a comparator a counting pulse when the superheat temperature lies within a tolerance range, a third counter receives a counting pulse by a comparator when the speed change of the superheat temperature lies below a tolerance range and a fourth counter receives a counting pulse when the speed of change lies above the relevant tolerance range. This permits very simple monitoring of the regulation departure and its speed of change at a low microprocessor capacity.

Figure 3:
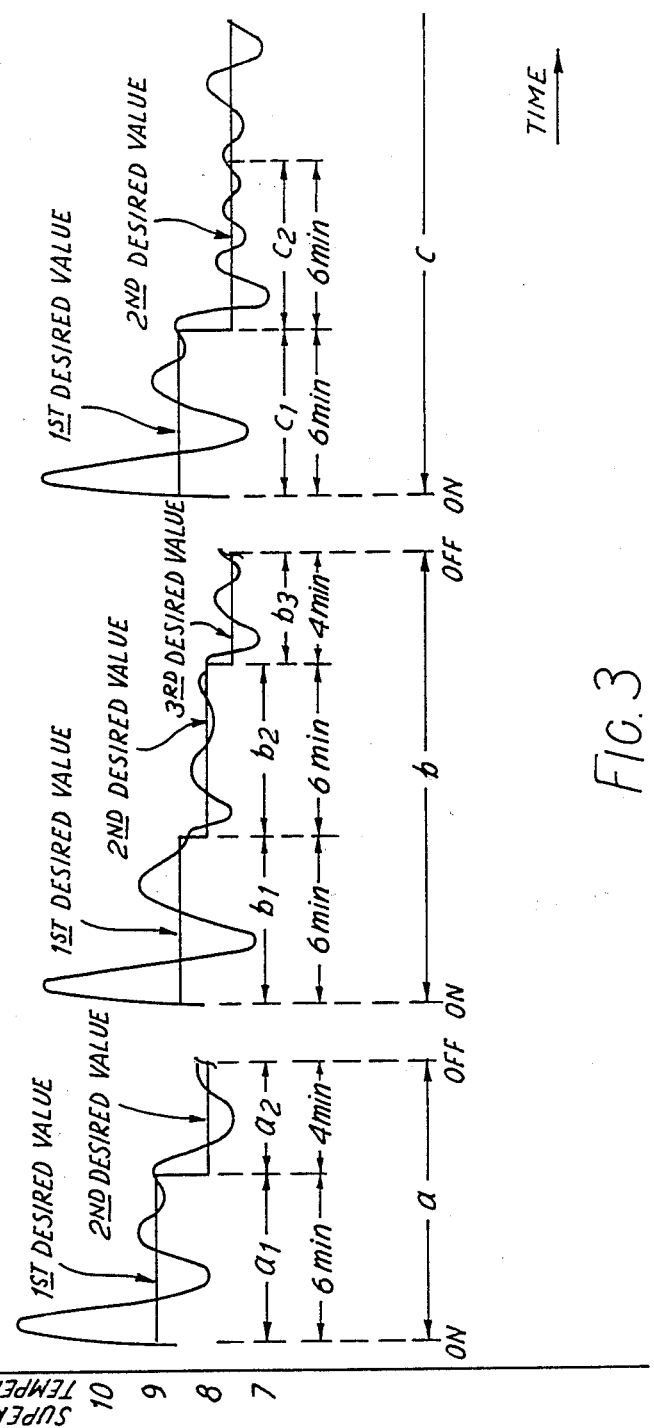
FIG. 3 illustrates the course of the superheat temperature of the refrigerant in three different operating periods with associated setting of the superheat temperature desired value.

FIG. 3 is a temperature-time graph showing the operation of the control circuit formed by the microprocessor and the regulation of the superheat temperature during three successive operating periods a, b and c. When the installation is switched on for the first time during the operating period a, a comparatively high superheat temperature desired value is requested from the data store 17, in the illustrated example 9° C. During initial valve opening, the superheat temperature rises rapidly to an excessively high value and, through the regulating device 5, brings about further opening of the expansion valve 3 so that the superheat temperature drops. After several oscillations about the desired value, the fading oscillation of the superheat temperature gradually reaches the steady state (desired value) in which it fluctuates only slightly about the desired value. During a predetermined starting period $a_1$, in this case 6 minutes, the desired value of the superheat temperature remains unchanged after switching on, i.e., without utilising the regulating procedure. Only when the regulating departure drops below a lower limiting value of the superheat temperature, i.e., the superheat temperature lies, say, 3° C. below the momentary desired value, a higher desired value is immediately called for without memorising the regulation departure or the regulating quality in the data store 17. However, this case is not considered in the signal flow diagram of FIG. 2. This immediate increase in the desired value when the superheat temperature falls below the momentary desired value by more than 3° C. also takes place in all subsequent time intervals.

Upon expiry of the starting time $a_1$, there is a data period of about 10 minutes during which the regulation departure $X_w$ of the superheat temperature and the regulating quality are periodically determined during a plurality of successive measurements, in this case 24, i.e., every 24 seconds, and are stored. Simultaneously, a second lower desired value of the superheat temperature, in this case 8° C., is called for use during this data storage period. Upon expiry of a first time interval $a_2$ of 4 minutes of the data storage period, the compressor 1 is switched off, for example by way of a coolroom thermostat.

When the compressor 1 is next switched on, there is again a starting period $b_1$ of 6 minutes without changing the desired value, but this time with a somewhat lower desired value of, for example, 8.5° C., than in the first starting period $a_1$ because the superheat temperature in the first starting period $a_1$ fell below the desired value only slightly, namely by no more than 1° C., which is detected by a simple limiting value comparison. Subsequently, the data storage period that had already begun during the first operating period a over the time interval $a_2$ of about 4 minutes is continued during the remaining time interval $b_2$ of 6 minutes with the same second desired value of 8° C. as during the time interval $a_2$. If the regulating quality was satisfactory during the time interval $b_2$, a third still lower desired value of, in this case, 7.5° C. is requested and a new data storage period is started which is interrupted after a time interval $b_3$ of 4 minutes as a result of switching the compressor off.

During the following operation period c one starts with the same superheat temperature desired value during the starting period $c_1$ of 6 minutes as during the starting periods for $b_1$ of the preceding operating period b because the superheat temperature had fallen below the desired value by more than 1° C. during the starting period $b_1$. During the subsequent time interval $c_2$ of the second data storage period $b_3+c_2$, the same desired value is maintained as at the end of the preceding operating period b and the same applies in the subsequent data storage period after expiry of the data storage period $b_2+c_2$ because the regulating quality was satisfactory, without, however, indicating that a low superheat temperature desired value should be set because the regulated quantity has not completely come to rest.

Every time a data storage period $a_2+b_2$ equal to $b_3+c_2$ equal to 10 minutes has expired, which can therefore extend over a plurality of operating periods, until 24 measurements have been carried out, the state of the counter is requested and the superheat temperature desired value is set correspondingly. If the measurement for the speed of change and the amount of the regulation departure of the superheat temperature exceeds an upper limiting value, which corresponds to a low regulating quality, a high desired value is called from the data store 17. On the other hand, if this value drops below a lower limiting value (high regulating quality), a low desired value is requested.

Figure 4:
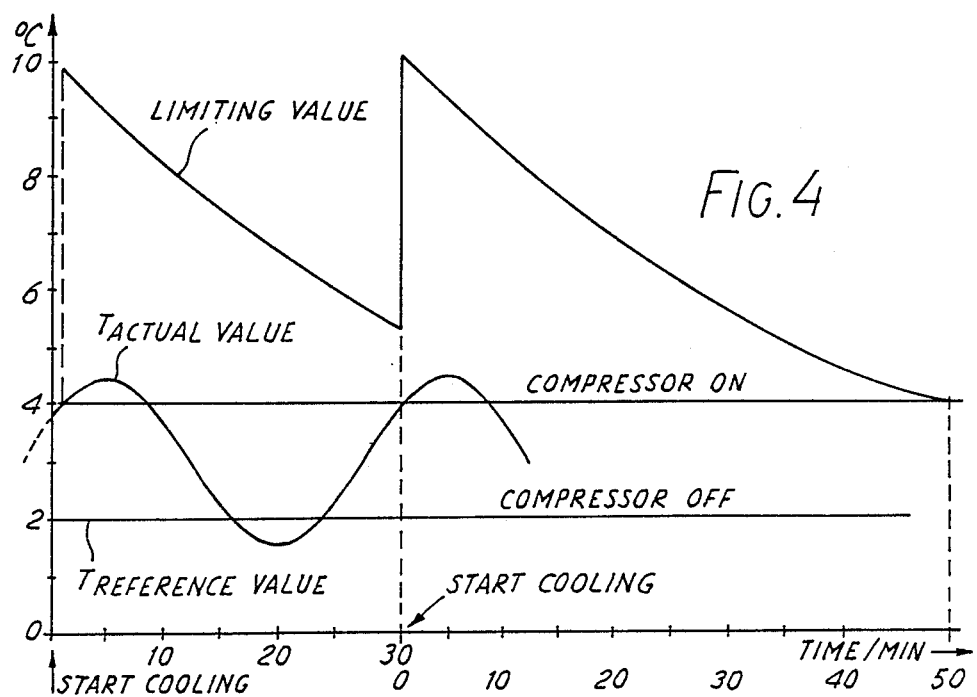
FIG. 4 is a time diagram of the coolroom temperature and the response limiting value of an alarm by which the coolroom temperature is monitored.

FIG. 4 illustrates a temperature-time graph showing the operation of an alarm which responds when the coolroom temperature exceeds a limiting value. During each renewed starting of the compressor of the refrigeration plant, the limiting value drops with time from a high initial value, in this case about 10° C., the illustrated curve for the limiting value being called by the microprocessor from a temperature table stored in the data store, so that the limiting value becomes all the lower with an increase in the length of operation. This has the advantage that the alarm will not respond unnecessarily if, when first starting the refrigeration plant or after opening the coolroom door several times at short intervals to place produce in the coolroom or to remove it, the coolroom temperature falls considerably below the desired value without there being any fault. During each renewed starting of the compressor, time registration starts again with 0. In the illustrated example, it take about 30 minutes from first switching on until the compressor starts again and renewed cooling takes place. If, after a further 50 minutes, the coolroom temperature has still not exceeded the switching on temperature of the compressor, the limiting value falls below the switching on temperature lying within the normal regulating different, it being favourable if, after a predetermined longer operating period, the limiting value assumes a lower constant value which is slightly above the normal coolroom temperature.

When the coolroom temperature has exceeded the limiting value, the alarm is, however, initiated after a predetermined delay period. The delay period can be several minutes, e.g., 10 to 20 minutes. This, for example, avoids immediate operation of the alarm caused by short-time opening of the coolroom door, for example, for a visual inspection.

We claim:

1. A cyclical method for optimally regulating the superheat temperature of the evaporator of a refrigeration or heat pump system of the type in which an evaporator, a compressor, a condenser and a controllable expansion valve are arranged in a closed circuit and temperature sensor devices are provided for sensing the inlet and outlet temperature of the evaporator;

said method comprising the steps of:
  A. setting an initial reference value UTS for a desired superheat temperature upon starting said system;
  B. determining said superheat temperature UT from said temperature sensors;
  C. determining a regulation departure value Xw which is the difference between said UT and said UTS;
  D. determining a time rate of change value d(UT)/dt of said superheat temperature;
  E. determining a regulating quality value R from predetermined criteria which is based at least in part on said time rate of change value d(UT)/dt of said superheat temperature;
  F. changing said desired superheat temperatures UTS in a predetermined manner in accordance with said regulating quality value R;
  G. regulating said expansion valve in accordance with said regulation departure value Xw; and
  H. returning to step B.

2. A method according to claim 1 wherein said predetermined criteria involves relative high, medium and low ranges of values for said value R.

3. A method according to claim 2 wherein in said step F said desired superheat temperature UTS is respectively reduced, maintained the same or increased in accordance with said ranges of said values for said value R.

4. A method according to claim 1 wherein said value R is also based at least in part on said regulation departure value Xw.

5. A method according to claim 1 including a step between said steps E and F wherein if said regulation departure value Xw is less than a predetermined negative temperature different then said UTS is increased on the order of 1° C. and said system returns to step B.

6. A method according to claim 3 wherein said UTS is reduced on the order of 0.5° C. and increased on the order of 0.5° C.

7. A method according to claim 3 wherein the selection of one of said ranges of said R as being effective to control said UTS for a cycle of operation during which values of said R are determined depends on said one of said ranges being dominant for a plurality of said subcycles.

8. A method according to claim 7 wherein a predetermined period of time on the order of ten minutes elapses before said selection is made.

9. A method according to claim 7 wherein comparators and counters are used to keep track of the frequency of dominance respectively of said ranges of said R.

* * * * *